(12) United States Patent
Rodoni

(10) Patent No.: US 11,361,379 B1
(45) Date of Patent: Jun. 14, 2022

(54) TRANSMITTING DRIVING DATA TO AN INSURANCE PLATFORM

(71) Applicant: Esurance Insurance Services, Inc., San Francisco, CA (US)

(72) Inventor: Philip Rodoni, San Rafael, CA (US)

(73) Assignee: ESURANCE INSURANCE SERVICES, INC., San Francisco, CA (US)

( * ) Notice: Subject to any disclaimer, the term of this patent is extended or adjusted under 35 U.S.C. 154(b) by 602 days.

(21) Appl. No.: 14/275,821

(22) Filed: May 12, 2014

(51) Int. Cl.
*G06Q 40/00* (2012.01)
*G06Q 40/08* (2012.01)
*G06Q 30/02* (2012.01)

(52) U.S. Cl.
CPC ......... *G06Q 40/08* (2013.01); *G06Q 30/0283* (2013.01)

(58) Field of Classification Search
None
See application file for complete search history.

(56) References Cited

U.S. PATENT DOCUMENTS

| | | | |
|---|---|---|---|
| 5,797,134 A | 8/1998 | McMillan et al. | |
| 6,064,970 A | 5/2000 | McMillan et al. | |
| 6,819,986 B2 | 11/2004 | Hong et al. | |
| 6,823,258 B2 | 11/2004 | Ukai et al. | |
| 7,339,483 B1 | 3/2008 | Farmer | |
| 7,542,915 B2 | 6/2009 | Kendrick | |
| 7,865,378 B2 | 1/2011 | Gay | |
| 7,890,355 B2 | 2/2011 | Gay et al. | |
| 7,987,103 B2 | 7/2011 | Gay et al. | |
| 7,991,629 B2 | 8/2011 | Gay et al. | |
| 8,027,853 B1 | 9/2011 | Kazenas | |
| 8,140,358 B1 | 3/2012 | Ling et al. | |
| 8,255,243 B2 | 8/2012 | Raines et al. | |
| 8,255,244 B2 | 8/2012 | Raines et al. | |
| 8,595,034 B2 | 11/2013 | Bauer et al. | |
| 8,666,786 B1 | 3/2014 | Wirz et al. | |
| 8,666,789 B1 | 3/2014 | Clauss et al. | |
| 9,253,603 B1 * | 2/2016 | Dong | H04W 4/48 |
| 2004/0039611 A1 | 2/2004 | Hong et al. | |
| 2004/0260579 A1 | 12/2004 | Tremiti | |
| 2005/0125259 A1 * | 6/2005 | Annappindi | G06Q 40/025 705/4 |
| 2005/0137757 A1 | 6/2005 | Phelan et al. | |
| 2005/0174217 A1 | 8/2005 | Basir et al. | |
| 2005/0182538 A1 | 8/2005 | Phelan et al. | |
| 2006/0053038 A1 | 3/2006 | Warren et al. | |
| 2006/0253307 A1 | 11/2006 | Warren et al. | |
| 2007/0027726 A1 | 2/2007 | Warren et al. | |
| 2007/0033076 A1 | 2/2007 | Sadeghi | |
| 2007/0061173 A1 | 3/2007 | Gay | |

(Continued)

OTHER PUBLICATIONS

"ITune Preview—MetroMile by MetroMile", retrieved from webpage https://itunes.apple.com/us/app/metromile/id734641795?mt=8, 2 pages, May 8, 2014.

*Primary Examiner* — Olabode Akintola
(74) *Attorney, Agent, or Firm* — Polsinelli PC

(57) ABSTRACT

Various aspects of the subject technology relate to transmitting driving data for a user to an insurance platform. A system may include one or more sensors configured to receive sensor data. Driving data for the user may be generated based on the sensor data and transmitted to an insurance platform for assessment of an insurance product.

19 Claims, 4 Drawing Sheets

(56) References Cited

U.S. PATENT DOCUMENTS

| | | |
|---|---|---|
| 2007/0299700 A1 | 12/2007 | Gay et al. |
| 2008/0065427 A1 | 3/2008 | Helitzer et al. |
| 2008/0312968 A1 | 12/2008 | Hannon et al. |
| 2009/0002147 A1* | 1/2009 | Bloebaum .......... H04M 1/72463 340/466 |
| 2010/0131300 A1 | 5/2010 | Collopy et al. |
| 2010/0131302 A1 | 5/2010 | Collopy et al. |
| 2010/0131303 A1 | 5/2010 | Collopy et al. |
| 2010/0131304 A1 | 5/2010 | Collopy et al. |
| 2011/0213628 A1* | 9/2011 | Peak ...................... G06Q 40/08 705/4 |
| 2012/0046974 A1* | 2/2012 | Eshleman ............... G06Q 30/06 705/4 |
| 2012/0166229 A1* | 6/2012 | Collins .................. G06Q 40/08 705/4 |
| 2013/0006675 A1 | 1/2013 | Bowne et al. |
| 2013/0013347 A1 | 1/2013 | Ling et al. |
| 2013/0013348 A1 | 1/2013 | Ling et al. |
| 2013/0046510 A1 | 2/2013 | Bowne et al. |
| 2013/0151288 A1 | 6/2013 | Bowne et al. |
| 2013/0179198 A1 | 7/2013 | Bowne et al. |
| 2013/0190967 A1* | 7/2013 | Hassib ................... G06Q 10/00 701/31.5 |
| 2013/0217331 A1* | 8/2013 | Manente ................ H04W 4/80 455/41.2 |
| 2013/0302758 A1* | 11/2013 | Wright .............. H04M 1/72412 434/65 |
| 2014/0108058 A1 | 4/2014 | Bourne et al. |
| 2014/0149145 A1* | 5/2014 | Peng ..................... G06F 3/0346 705/4 |

\* cited by examiner

US 11,361,379 B1

TRANSMITTING DRIVING DATA TO AN INSURANCE PLATFORM

BACKGROUND

The present disclosure generally relates to determining user driving behavior and, in particular, to determining user driving behavior using a mobile device.

Insurance companies calculate rates for car insurance for customers based on various factors. For example, factors such as where a customer lives, the make, model, and year of the car they drive, and their age may all be taken into consideration when calculating an insurance rate. These factors are used to generate a driver profile that attempts to determine what type of driver the customer is (e.g., whether the customer is a risky driver or a safe driver). Riskier drivers may receive more costly insurance quotes than safer drivers. However, the use of these factors may not be as accurate as actual driving data in determining what type of driver a customer is.

Some attempts to achieve more accurate driver profiles and to broaden potential client base include Usage-Based Insurance (UBI) strategies. UBI strategies typically involve the installation of a tracking device in a vehicle. For example, some UBI strategies involve plugging the tracking device to the On-Board Diagnostic (OBD) device in the vehicle. Such approaches involve at least a step where the user receives the tracking device from the insurance vendor or a third party, and a step where the user plugs the tracking device to the vehicle's OBD. Accordingly, users are discouraged from purchasing such UBI strategies due to the extra steps and the technical know-how involved. Furthermore, addition of a tracking device to the vehicle creates the issue of handling the hardware upon termination of the policy, or upgrading the policy to a new or different vehicle.

SUMMARY

Various aspects of the subject technology relate to system for transmitting driving data for a user to an insurance platform. The system includes one or more processors, one or more sensors configured to receive sensor data, and a machine-readable medium comprising instructions stored therein, which when executed by the one or more processors, cause the one or more processors to perform operations. The operations include generating driving data for the user based on the sensor data and transmitting, via a network, the driving data for the user to an insurance platform for rate assessment by the insurance platform.

Some aspects of the subject technology relate to a method for transmitting driving data for a user to an insurance platform. The method includes receiving sensor data from a mobile device associated with a user, determining whether the user is in a driving state based on the sensor data, generating driving data for the user when the user is in the driving state, and transmitting, via a network, the driving data for the user to an insurance platform for rate assessment by the insurance platform.

Some aspects of the subject technology relate to a non-transitory machine-readable medium comprising instructions stored therein, which when executed by a machine, cause the machine to perform operations. The operations include generating driving data for the user based on the sensor data from sensors on a smartphone device associated with a user and transmitting, via a network, the driving data for the user to an insurance platform for rate assessment by the insurance platform.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Various aspects of the subject technology relate to transmitting driving data for a user to an insurance platform. A system may include one or more sensors configured to receive sensor data. Driving data for the user may be generated based on the sensor data and transmitted to an insurance platform for modification of an insurance product. For example, rates or fees associated with a vehicle insurance policy provided by the insurance platform may be adjusted by the insurance platform based on the received driving data. By using driving data for a user, the insurance platform may more accurately assess what type of driver a user is, more accurately assess risks for the user, and provide the user with insurance products that are more personalized to the user and possibly lowering insurance costs for safe drivers. Accordingly, embodiments consistent with the present disclosure use the ability of mobile device technology to include detailed characteristics of a driver behavior in a personalized insurance policy. Some characteristics of a driver behavior include turning speed, braking speed, and acceleration patterns. Some embodiments include erratic behavior characteristics, such as continued lane shifting, speed irregularity, and directional features including sudden turns, drifting, and the like.

Figure 1:
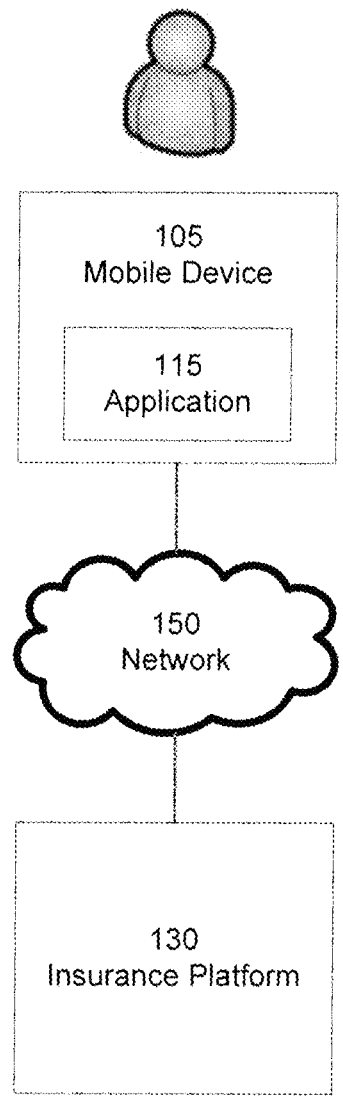
FIG. 1 is a block diagram illustrating an example environment in which a system for transmitting driving data for a user to an insurance platform may exist in accordance with various aspects of the subject technology.

FIG. 1 is a block diagram illustrating an example environment 100 in which a system for transmitting driving data for a user to an insurance platform may exist in accordance with various aspects of the subject technology. The environment 100 may include mobile device 105 and an insurance platform 130 in communication with one another via the network 150, although in other implementations, additional entities or alternative entities may be used.

The mobile device 105 may include, for example, a smart phone, a tablet, smart watch, a set of smart glasses, a camera device, or any other device capable of communicating with other devices via a network 150. The mobile device 105 may be a computing device that is typically carried by or taken with the user. However, in other aspects of the subject technology, other computing devices may also be used. According to some aspects of the subject technology, the system may be implemented as an application 115 installed on a mobile device 105, such as a smart phone. For example, a user may download an application 115 provided by the insurance platform 130 and install the application 115 on the user's smart phone. Alternatively, the application 115 may be previously installed on the user's smart phone. The application 115 may access data from the various hardware and software sensors of the user's mobile device 105 in order to generate driver data and transmit the driver data to the insurance platform. In some embodiments mobile device 105 may gather driver data provided wirelessly from the vehicle's OBD device. For example, in some embodiments mobile device 105 is configured to communicate with the OBD device using a Bluetooth enabled transmitter included in the vehicle.

Accordingly, the system may function without any specialized devices that may be costly to provide and confusing for a user to install on the user's vehicle. Furthermore, because the system may be implemented on the user's smartphone, which is often carried by the user, the driving data may be personalized to the user and get a more complete picture of the driving habits of the user. For example, compared to a device that may be installed on or plugged into a vehicle, the system implemented on the user's smartphone may be able to obtain driving data for the user when the user is driving other vehicles (as many families have two or more vehicles). The system may also prevent driving data for another person driving the user's vehicle from being used as the user's driving data because the user's smartphone is usually with the user and is not tied to the vehicle.

The driving data generated by the system on the mobile device 105 may be transmitted to the insurance platform 130 over the network 150. The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The insurance platform 130 may be implemented on one or more computing machines (e.g., servers) in communication with the network 150. The insurance platform 130 may be associated with a single entity (e.g., a company) or multiple entities that work together to provide insurance services to customers. The insurance platform 130 is configured to receive the driving data for a user from the mobile device 105 and adjust one or more insurance products associated with the user based on the driving data. For example, the insurance platform 130 may calculate a driving score based on the driving data for the user and adjust an existing insurance policy for the user, provide discounts or other products to the user based on the driving data, increase or decrease fees associated with an insurance product, or generate alerts to an owner of an insurance product. Advertisements or other content may also be provided to the owner of the insurance product based on the driving data for the user received from the mobile device 105.

Figure 2:
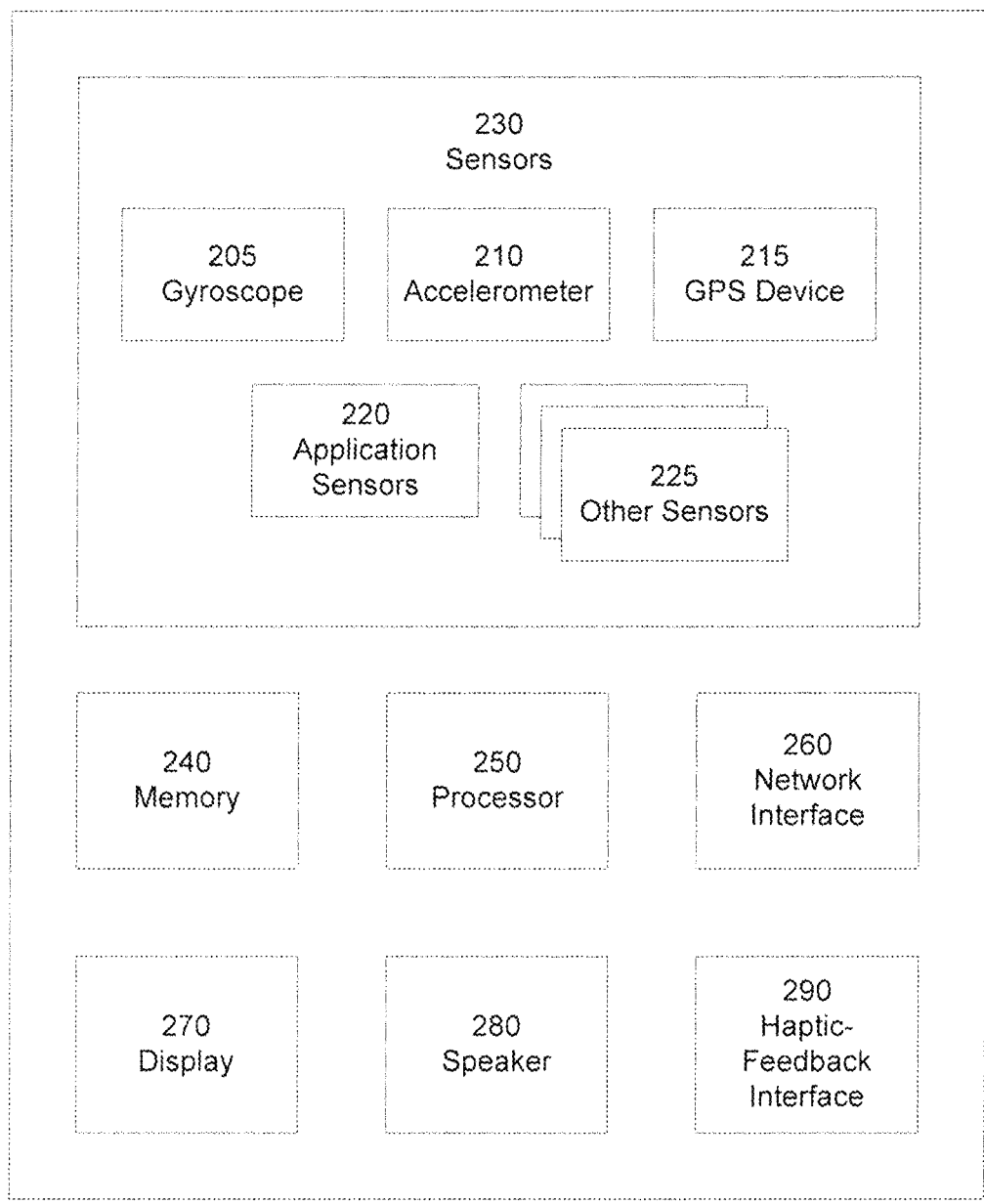
FIG. 2 is a block diagram illustrating an example mobile device in accordance with various aspects of the subject technology.

FIG. 2 is a block diagram illustrating an example mobile device 200 in accordance with various aspects of the subject technology. Examples of a mobile device 200 may include a smartphone, a smart watch, or smart glasses. The mobile device 200 may include one or more sensors 230, one or more memories 240, one or more processors 250, a network interface 260, a display 270, a speaker 280, and/or a haptic-feedback interface 290. According to other aspects however, the mobile device 200 may include additional components, fewer components, or alternative components.

The sensors 230 may be configured to generate various sensor data that may be used to determine when a user is in a driving state (e.g., when the user is driving) and used to generate driving data about the user's driving behavior. For example, the data can indicate turning speed, braking speed, acceleration patterns, continued lane shifting, speed irregularity, sudden turns, drifting, and the like. The sensors 230 may include, for example, a gyroscope 205 configured to generate orientation data, an accelerometer 210 configured to generate acceleration data, and/or a global positioning system (GPS) device 215 or other location sensing device configured to generate location data.

The sensors 230 may also include application sensors 220 or software sensors configured to detect and generate mobile device usage data. For example, the application sensors 220 may determine whether a user is using the mobile device 200, what the user is doing with the mobile device 200, and other information about the user's interaction with the mobile device 200. The mobile device usage data may be indicative of whether the user is focused on driving or instead interacting with the mobile device 200 while driving.

The information may include, for example, what application is currently open and running (e.g., a text messaging application, an email application, a web browser, etc.), what application is being displayed, whether the user is providing input to the mobile device 200 (e.g., keyboard input, scrolling, accessing buttons or other interface items, etc.), or how active applications are (e.g., whether a web browser is actively requesting and loading content). The information may further include whether the mobile device 200 is receiving calls, an average number of calls per time period, whether the user picks up calls while driving, the average length of calls while driving, and any other information associated with the user's usage of the mobile device 200.

The information may also include user information such as account logins for certain applications. According to some aspects, an application (e.g., the application 115 in FIG. 1) configured to generate and transmit driving data for a user may associate the driving data with the user logged into the application. The sensors 230 may also include other sensors 225 not specifically shown in FIG. 2. For example, the system may include a camera configured to capture images, video, or video feeds, a microphone configured to record sounds, or one or more biometric scanners (e.g., a fingerprint scanner) configured to identify specific users that may be driving.

According to some aspects, the mobile device 200 may also include one or more memories 240 configured to store data such as sensor data or driving data to be transmitted to the insurance platform 130. The memory 240 may also include a machine-readable medium (also referred to as a computer-readable medium) storing one or more sets of instructions, such as the application 115 in FIG. 1, which may be executed by the processor 250 in order to perform the processes described herein.

The network interface 260 is configured to transmit and receive data from the insurance platform 130 or other devices over the network 150. For example, the network interface 260 may transmit driving data to the insurance platform 130 and receive notifications, advertisements, or other content from the insurance platform 130. The mobile device 200 may also include a display 270, a speaker 280, and/or a haptic feedback device 290 configured to provide information (e.g., visual content, audible content, or haptic feedback) to a user. The mobile device 200 may also include a power supply (not shown in FIG. 2) configured to provide the mobile device 200 with power. The power supply may be configured to interface with an external power source such as a wall outlet, vehicle power outlet, or an external battery.

Figure 3:
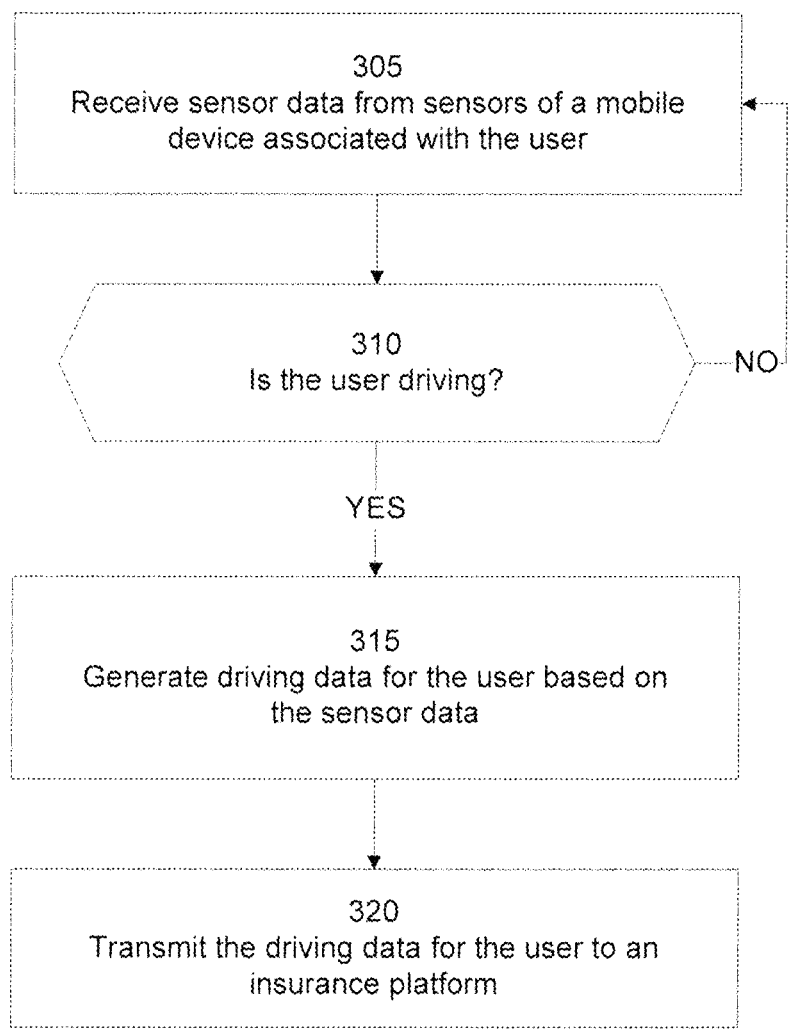
FIG. 3 is a flow chart illustrating an example process for providing driving data for a user to an insurance platform in accordance with various aspects of the subject technology.

FIG. 3 is a flow chart illustrating an example process 300 for providing driving data for a user to an insurance platform in accordance with various aspects of the subject technology. Although the blocks in FIG. 3 are shown in a particular order, other orderings are also possible. For example, some blocks may be performed in different orders or in parallel with other blocks.

According to some aspects the subject technology, the process may be performed by a mobile device 105 and, in particular, an application 115 running on the mobile device 105. For example, a user of a mobile device 105 may download and install the application 115 on the mobile device 105. Once the application 115 is installed, the user may open the application 115 on the mobile device 105. The application 115 may authenticate the user so that the user may be associated with an account that is recognized by the insurance platform 130. For example, authentication may occur based on the user providing a user name and password or through biometric input (e.g., scanning a fingerprint).

The application 115 may run in the background on the mobile device 105 and, at block 305, receive sensor data from the sensors of the mobile device 105 associated with the user. At block 310, the application 115 may determine whether the user is driving (e.g., whether the user is in a driving state). The application may determine whether the user is driving based on any number of different factors or combinations of factors. For example, in some embodiments the user provides a manual indication of a driving condition simply by pressing a button, activating a touch screen tab provided by application 115, or providing a voice input indicating the driving condition.

According to some aspects of the subject technology, the application 115 may determine whether the user is driving by determining, based on the sensor data from the mobile device, a speed at which the user is traveling and comparing that speed with a threshold speed (e.g., 15 miles per hour). If the user's speed is over the threshold speed, the application 115 may determine that the user is driving. According to some aspects of the subject technology, the application 115 may determine whether the user is driving by determining, based on the sensor data from the mobile device, a distance that the user has traveled and comparing that distance with a threshold distance (e.g., 3 miles). If the user has traveled more than the threshold distance, the application 115 may determine that the user is driving.

According to other aspects of the subject technology, the application 115 may determine whether the user is in the driving state by identifying, based on the sensor data from the mobile device, a route traveled by the user and determining whether that route is traveling a route associated with a particular transit type. For example, the particular transit type may be a bus route, a train route, a public transportation route, a biking route, a boat route, a waterway, or an aerial route. The application 115 may determine that the user is driving if the route traveled by the user is associated with the particular transit type. In some embodiments, at least one of application 115 and insurance platform 130 discard driving data when the user is in a bus route, a train route, a public transportation route, a boat route, a waterway or an aerial route.

In other implementations, the application 115 may determine whether the user is driving by prompting the user to provide an indication that the user is driving or not driving. The indication may include the user selecting a button on the display. According to other aspects, the indication may include the user linking the mobile device 105 to the vehicle (e.g., a Bluetooth link). In some embodiments, the user indicates a driving condition via a voice control feature included in application 115. In still other aspects, the application 115 may determine whether the user is driving by identifying wireless signals detected by the mobile device 105. The wireless signals may include, for example, Bluetooth signals or Wi-Fi signals. For example, if the mobile device 105 detects a Wi-Fi network that is known to be a public transportation network, then the user may be on a form of public transportation and not driving. If the mobile device 105 detects 8 or more Bluetooth signals for a period of time (e.g., 2 minutes), then the mobile device 105 may be on a form of public transportation with other people using Bluetooth enabled devices. Accordingly, the user is deemed to not be driving.

Further, some embodiments include detailed data processing to indicate that the user of mobile device 105 is a driver and not a passenger of the vehicle. For example, the data processing may include determining that the user is not manipulating mobile device 105 while driving data is collected. Other indicators of the user being actually at the wheel may include detecting that mobile device 105 is approximately in a fixed orientation relative to the vehicle orientation, or based on a connection (e.g., via Bluetooth) between the mobile device 105 and an onboard computer of the vehicle (e.g., indicating, for example, that the user is the driver because the user's smartphone is connected to the vehicle's telephone functionality).

According to other aspects of the subject technology, rules that combine multiple factors may be used in determining whether the user is driving. For illustrative purposes, one example rule may state that a user is driving if the user has traveled over 40 miles per hour for one minute and/or 5 consecutive miles. Another example rule may state that a user is driving if the average speed for a user for the last hour is over 10 miles per hour.

Returning to FIG. 3, if the user is not driving, the application may continue to receive the sensor data at block 305. If, on the other hand, the user is driving, at block 315, the application 115 may generate driving data for the user based on the sensor data. Driving data may include, for example, various speed measurements for the user, whether there are sudden braking actions, and/or sudden accelerations. The driving data may also include speed for certain situations such as entering school zones, on turns, and/or on on-ramps and off-ramps. The driving data may further include locations (e.g., general areas, cities, counties, etc.) in which the user typically drives, the amount of time the user drives in particular locations, and/or the when the user typically drives. The user's speed measurements can then be compared to known speed limits for the locations. The driving data may further include sensor data from the sensors on the mobile device 105 such as, for example, mobile device usage data.

At block 320, the application may transmit the driving data for the user to an insurance platform 130 where it may be used by the insurance platform 130 to assess one or more insurance products associated with the user or provide content to the user based on the driving data. According to some aspects of the subject technology, the insurance platform may calculate a driving score for the user based on the user's driving data and adjust an existing insurance policy for the user, provide discounts or other products to the user based on the driving data, or increase or decrease fees associated with an insurance product.

The insurance platform 130 may also generate communications (e.g., alerts, messages, or notifications) for a user based on the user's driving data and transmit the alerts or notifications to the user. For example, the insurance platform may email the user at an email address provided by the user or transmit communications to the mobile device 105 (e.g., a text message) and/or the application 115 (e.g., an application message or alert). The communications may include, for example, an assessment of recent driving activity of the user, notifications for safe or risky driving, tips on how to improve driving behavior, and/or information about how driving behavior (the user's or in general) may affect adjustments to insurance products.

According to some aspects of the subject technology, the application 115 on the mobile device 105 may be configured to analyze the generated driving data and determine driving behaviors of the user. The application 115 may also provide one or more real-time notifications about the driving behaviors to the user via the mobile device while the user is driving. For example, if the application 115 determines that a hard acceleration event was detected, the application 115 may send a notification to the user. The notification may include an audible sound or haptic feedback (e.g., two quick vibrations or buzzes) that may inform the user that a hard acceleration event was detected without the user having to take the user's eyes off the road. However, in other aspects, visual notifications may also be used. Notifications may also be generated for hard braking events, speeding, using the mobile device while driving, or any other driving behavior for the user.

According to other aspects of the subject technology, a driving score may be calculated and provided to the user along with driving details or characteristics about how the user was driving during a recent driving event. Tips on how to improve the score may also be delivered to the user. The information provided to the user may be provided in real-time as the information is calculated while the user is driving or after a driving event. Furthermore, the information may also be delivered to the user via an email. The feedback provided to the user may help the user modify the user's driving behavior (e.g., to help the user drive more safely) and, as a result, help the user adjust an insurance product associated with the user.

Figure 4:
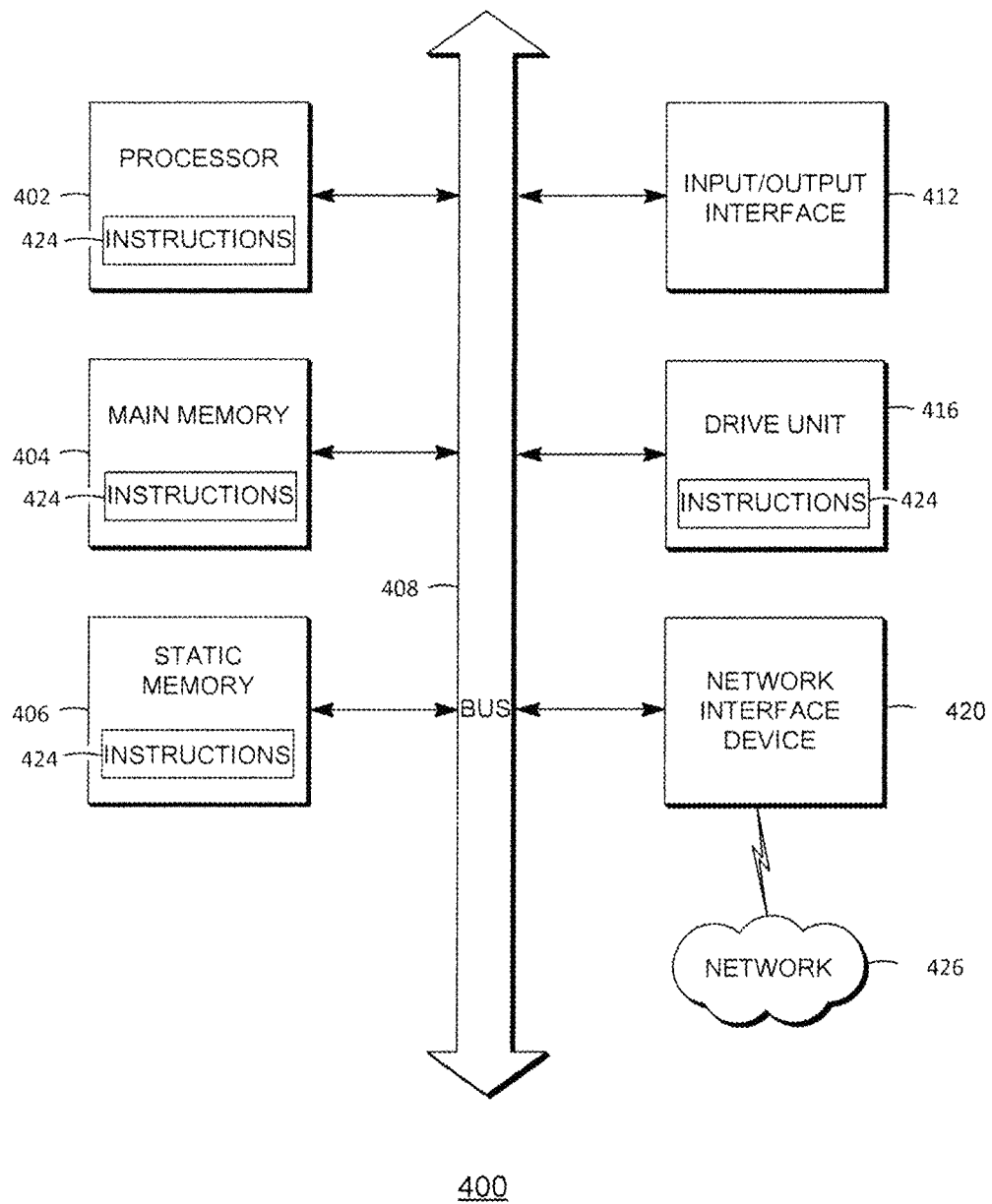
FIG. 4 is a block diagram illustrating an example computer system with which any of the computing machines, devices, or systems discussed herein may be implemented, in accordance with some aspects of the subject technology.

FIG. 4 is a block diagram illustrating an example computer system 400 with which any of the computing machines, devices, or systems discussed herein may be implemented, in accordance with some aspects of the subject technology. In certain aspects, the computer system 400 may be implemented using hardware or a combination of software and hardware, either in a dedicated server, or integrated into another entity, or distributed across multiple entities.

The example computer system 400 includes a processor 402, a main memory 404, a static memory 406, a disk drive unit 416, and a network interface device 420 which communicate with each other via a bus 408. The computer system 400 may further include an input/output interface 412 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 402 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 424 embodying any one or more of the methodologies or functions described herein. The instructions 424 may also reside, completely or at least partially, within the main memory 404 and/or within the processor 402 during execution thereof by the computer system 400, with the main memory 404 and the processor 402 also constituting machine-readable media. The instructions 424 may further be transmitted or received over a network 426 via the network interface device 420.

The machine-readable medium may be a single medium or multiple media (e.g., a centralized or distributed database, and/or associated caches and servers) that store the one or more sets of instructions. The machine-readable medium may include the drive unit 416, the static memory 406, the main memory 404, the processor 402, an external memory connected to the input/output interface 412, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

The various illustrative blocks, modules, elements, components, methods; and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method comprising:
   receiving, by a wireless transceiver at a mobile wireless device associated with a user, at least one short-range wireless signal;
   determining, by the mobile wireless device, that the user is in a driving state comprising being a driver of a vehicle, the determining being based on a fixed orientation of the mobile wireless device relative to an orientation of the vehicle, and further based on the at least one short-range wireless signal originating from greater than one and fewer than a threshold quantity of other mobile wireless devices, the other mobile wireless devices being in a same vehicle as the user, the other mobile wireless devices being in a same vehicle as the user;
   in response to determining that the user is in the driving state, generating, by the mobile wireless device, driving data for the user and mobile wireless device usage data for the user, the mobile wireless device usage data indicating one or more user interactions with the mobile wireless device; and
   transmitting, by the mobile wireless device and via a network, the driving data for the user and the mobile wireless device usage data for the user to an insurance platform for rate assessment by the insurance platform.

2. The method of claim 1, wherein the mobile wireless device comprises a smartphone.

3. The method of claim 1, further comprising:
   collecting, by one or more sensors, sensor data, the sensor data including acceleration data, orientation data, location data, and/or mobile wireless device usage data.

4. The method of claim 3, wherein the one or more sensors comprise an accelerometer, a gyroscope, and/or a global positioning system (GPS) device.

5. The method of claim 3, wherein the user is further determined to be in the driving state based at least on the sensor data indicating that the user is traveling over a threshold speed.

6. The method of claim 3, wherein the user is further determined to be in the driving state based at least on the sensor data indicating that user is traveling a route associated with a particular transit type.

7. The method of claim 6, wherein the particular transit type is at least one of a bus route, a train route, a public transportation route, a boat route, a waterway, or an aerial route.

8. The method of claim 1, wherein the user is further determined to be in the driving state, based at least on an indication provided by the user, via the mobile wireless device, that the user is in the driving state.

9. The method of claim 1, further comprising:
   determining a driving behavior based on the driving data; and
   providing, based on the driving behavior, a notification to the user via the mobile wireless device.

10. The method of claim 1, wherein the at least one short-range wireless signal comprises a Bluetooth signal and wherein one of the at least one short-range wireless signal is from an on-board diagnostics device plugged in the vehicle.

11. The method of claim 1, further comprising:
    determining that the user is taking public transportation, the determining being based at least on the at least one short-range wireless signal originating from greater than or equal to the threshold quantity of the other mobile wireless devices.

12. An apparatus, comprising:
    one or more processors;
    a wireless transceiver configured to receive at least one short-range wireless signal;
    one or more sensors configured to collect sensor data; and
    a machine-readable medium comprising instructions stored therein, which when executed by the one or more processors, cause the one or more processors to perform operations comprising:
      determining that a user is in a driving state comprising the user being a driver of a vehicle, the determining being based on a fixed orientation of a mobile wireless device of the user relative to an orientation of the vehicle, and further based on the at least one short-range wireless signal originating from greater than one and fewer than a threshold quantity of other mobile wireless devices, the other mobile wireless devices being in a same vehicle as the user;
      in response to determining that the user is in the driving state, generating, based at least on the sensor data, driving data for the user and mobile wireless device usage data for the user, the mobile wireless device usage data indicating one or more user interactions with the mobile wireless device; and transmitting, via a network, the driving data for the user and the mobile wireless device usage data for the user to an insurance platform for rate assessment by the insurance platform.

13. The apparatus of claim 12, wherein the apparatus comprises a smartphone.

14. The apparatus of claim 12, wherein the one or more sensors comprise an accelerometer, a gyroscope, and/or a global positioning system (GPS) device.

15. The apparatus of claim 14, wherein the sensor data includes acceleration data, orientation data, location data, and/or mobile wireless device usage data, and wherein the user is determined to be in the driving state further based at least on the sensor data.

16. The apparatus of claim 12, further comprising:
determining a driving behavior based on the driving data; and
providing, based on the driving behavior, a notification to the user via the mobile wireless device.

17. The apparatus of claim 16, further comprising a display, a speaker, and/or a haptic-feedback device, the notification being provided via the display, the speaker, and/or the haptic-feedback device.

18. A non-transitory machine-readable medium comprising instructions stored therein, which when executed by a machine, cause the machine to perform operations comprising:

receiving, by a wireless transceiver at a mobile wireless device associated with a user, one or more short-range wireless signals;

determining, by the mobile wireless device, that the user is in a driving state comprising the user being a driver of a vehicle, the determining being based on a fixed orientation of the mobile wireless device relative to an orientation of the vehicle, and further based on the one or more short-range wireless signals originating from greater than one and fewer than a threshold quantity of other mobile wireless devices, the other mobile wireless devices being in a same vehicle as the user;

in response to determining that the user is in the driving state, generating, by the mobile wireless device, driving data for the user and mobile wireless device usage data for the user, the mobile wireless device usage data indicating one or more user interactions with the mobile wireless device; and transmitting, by the mobile wireless device and via a network, the driving data for the user and the mobile wireless device usage data for the user to an insurance platform for rate assessment by the insurance platform.

19. The non-transitory machine-readable medium of claim 18, wherein the driving data enables the insurance platform to calculate a driving score.

\* \* \* \* \*